United States Patent
Yamagami

(10) Patent No.: US 7,030,914 B2
(45) Date of Patent: Apr. 18, 2006

(54) RECORDING DEVICE, RECORDING METHOD, ELECTRONIC DEVICE METHOD OF CONTROLLING ELECTRONIC DEVICE, COMPUTER READABLE MEDIA, AND REPRODUCING DEVICE

(75) Inventor: Taku Yamagami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/892,092

(22) Filed: Jul. 14, 1997

(65) Prior Publication Data

US 2002/0033888 A1 Mar. 21, 2002

(30) Foreign Application Priority Data

Jul. 19, 1996 (JP) .................................. 8-191197

(51) Int. Cl.
*H04N 5/76* (2006.01)
*H04N 5/222* (2006.01)
*H04N 5/225* (2006.01)

(52) U.S. Cl. .............................. 348/231.2; 348/333.02; 348/207.1

(58) Field of Classification Search ................ 348/231, 348/232, 233, 552, 589, 600, 231.2, 231.3, 348/231.5, 231.7, 220.1, 231.6, 231.9, 333.02, 348/239; 358/906, 909.1; 386/95, 124, 386/125, 126, 117
See application file for complete search history.

(56) References Cited

U.S. PATENT DOCUMENTS

| | | | | |
|---|---|---|---|---|
| 5,477,264 A | * | 12/1995 | Sarbadhikari et al. | ... 348/231.6 |
| 5,497,194 A | * | 3/1996 | Sakagami et al. | ....... 348/231.4 |
| 5,590,306 A | * | 12/1996 | Watanabe et al. | ........... 348/233 |
| 5,633,678 A | * | 5/1997 | Parulski et al. | .......... 348/231.5 |
| 5,635,983 A | * | 6/1997 | Ohmori | .................... 348/231.6 |
| 5,640,204 A | * | 6/1997 | Tsutsui | ..................... 348/231.3 |
| 5,699,549 A | * | 12/1997 | Cho | ........................... 348/233 |
| 5,719,987 A | * | 2/1998 | Kawamura et al. | ......... 386/120 |
| 5,739,850 A | * | 4/1998 | Hori | ............................ 348/231 |
| 5,768,503 A | * | 6/1998 | Olkin | ....................... 114/230.2 |
| 5,778,065 A | * | 7/1998 | Hauser et al. | .............. 713/171 |
| 5,788,507 A | * | 8/1998 | Redford et al. | ............. 348/734 |
| 5,796,428 A | * | 8/1998 | Matsumoto et al. | ........ 348/231 |
| 5,806,072 A | * | 9/1998 | Kuba et al. | ................. 348/231 |
| 5,845,044 A | * | 12/1998 | Iizuka et al. | ............. 348/231.6 |
| 5,861,918 A | * | 1/1999 | Anderson et al. | ........ 348/231.9 |
| 5,862,217 A | * | 1/1999 | Steinberg et al. | ........... 348/231 |

(Continued)

FOREIGN PATENT DOCUMENTS

JP 06231023 A * 8/1994

(Continued)

OTHER PUBLICATIONS

Machine-Assisted Translation of Japanese Publication No. 06-231023 A; Thomas-Derwent.*

*Primary Examiner*—Ngoc-Yen Yu
*Assistant Examiner*—John M. Villecco
(74) *Attorney, Agent, or Firm*—Fitzpatrick, Cella, Harper & Scinto

(57) ABSTRACT

Recording apparatus and method for recording at least one of image data and voice data on a recording medium includes structure and/or steps for generating image data or voice data to be recorded. Structure and/or steps are provided for obtaining attribute information to be recorded relating to the image data or the voice data and which is generated in an external device in advance before generating the image data or the voice data. Recording structure and/or steps are provided for recording the obtained attribute information and relating it to the generated image data or the voice data.

8 Claims, 5 Drawing Sheets

U.S. PATENT DOCUMENTS

| | | | |
|---|---|---|---|
| 5,899,581 A * | 5/1999 | Kawamura et al. | 348/220 |
| 5,943,093 A * | 8/1999 | Anderson et al. | 348/231.6 |
| 6,002,429 A * | 12/1999 | Ochi et al. | 348/220.1 |
| 6,192,191 B1 * | 2/2001 | Suga et al. | 386/120 |
| 6,418,272 B1 * | 7/2002 | Higashiyama | 386/104 |
| 6,704,047 B1 * | 3/2004 | Tsutsui | 348/231.7 |
| 6,765,612 B1 * | 7/2004 | Anderson et al. | 348/231.2 |

FOREIGN PATENT DOCUMENTS

| | | | |
|---|---|---|---|
| JP | 07073205 A | * | 3/1995 |
| JP | 09305464 A | * | 11/1997 |

* cited by examiner

FIG. 5

| Name | Size | Type | Modified | Owner's name |
|---|---|---|---|---|
| ☐ Thm_0001. tif | 15KB | TIF File | 5/15/96.3.36PM | Ozaki |
| ☐ Thm_0002. tif | 15KB | TIF File | 5/15/96.3.40PM | Ozaki |
| ☐ Med_0001. jpg | 203KB | U lead Photo 1… | 5/15/96.4.11PM | Ozaki |
| ☐ Sml_0001. jpg | 30KB | U lead Photo 1… | 5/3/96.4.22PM | Suzuki |
| ☐ Lrg_0001. jpg | 800KB | U lead Photo | 5/1/96.4.02AM | Suzuki |

500 PERSONAL COMPUTER SCREEN
503 WINDOW
505
507

RECORDING DEVICE, RECORDING METHOD, ELECTRONIC DEVICE METHOD OF CONTROLLING ELECTRONIC DEVICE, COMPUTER READABLE MEDIA, AND REPRODUCING DEVICE

BACKGROUND OF THE INVENTION

1. Field of the Invention

The present invention relates to a recording device (such as a digital camera for digitalizing image or voice to record it), a recording method, an electronic device used together with the recording device, a method of controlling the electronic device, a computer readable media, and a reproducing device.

2. Description of the Related Art

There are conventional digital cameras for digitalizing image or voice to be recorded it on PCMCIA (Personal Computer Memory Card International Association) recording media such as semiconductor memory cards or compact hard disks. The PCMCIA recording media is designed such that data recorded on the media can be read by a host computer. Image data and voice data are generally compression-coded to be recorded on the media.

Data related to an image, e.g., information such as a photographing date, a photographing mode, or photographing condition, are recorded in respective files. The respective file names are determined by a camera. For example, the file name of an image is constituted by three head letters, e.g., "IMG", having a 5-digit number following the head letters.

In a conventional digital camera, as relative data to be added to an image, data such as a model name of the camera, a production number of the camera, a date, and photographing data which are generated by a camera are used. For this reason, a user cannot define arbitrary attribute information, e.g., exclusive user information which represents that the camera is his/her own camera.

The name of an image data file generated by a camera is fixedly defined by a program for operating the system of the camera. For this reason, a user cannot provide a file name which is required by the user himself/herself, and after a photographing operation, the user inconveniently arranges files.

SUMMARY OF THE INVENTION

It is an object of the present invention to solve the above problem and provide an image recording device which can be easily used.

It is another object of the present invention to make it possible for a user to externally set an attribute (except for an additional attribute generated by an image recording device) to store the attribute in a file.

It is still another object of the present invention to make it possible for a user to freely set a file name.

It is still another object of the present invention to provide a recording device and an electronic device which are used so that a user can freely externally set an attribute.

It is still another object of the present invention to provide a computer readable media in which a program for an electronic device for realizing the functions described above.

In order to achieve the above objects, according to an aspect of the present invention, there is disclosed a device in which exclusive user information (added to respective image and voice data) are set by a user to be held in a recording device, and, during formation of image and voice files, the recording device stores the set attribute information in the files.

According to this aspect, process information of file name generated by the recording device is held in the recording device, and the recording device forms a file name according to the set, process information during formation of image and voice files. In this case, the process information of file names is set by a user to be held in the recording device, and the file name is generated according to the set process information. Of the process information held in the recording device, according to a photographing recording mode set by the user, a file name may be generated.

An external device may comprise means for setting the attribute data or the process information of file names, and the recording device may communicate with the external device to set the attribute data and the process information in the recording device. More specifically, according to this aspect, for example, there is disclosed a device having attribute data holding means for holding attribute data added to image data or voice data; means, having setting means for setting attribute data arranged outside a recording device, which communicates with the setting means to set the attribute data in the attribute data holding means; and recording means for storing the attribute data held in the attribute data holding means in an image data file or a voice data file during a recording operation of the image data or the voice data.

Still other objects and characteristics of the present invention will be apparent according to the following explanation of an embodiment thereof.

BRIEF DESCRIPTION OF THE DRAWINGS

FIG. 5 is a view showing file names displayed on the screen of the host computer.

DESCRIPTION OF THE PREFERRED EMBODIMENT

An embodiment of the present invention will be described below with reference to the accompanying drawings.

Figure 1:
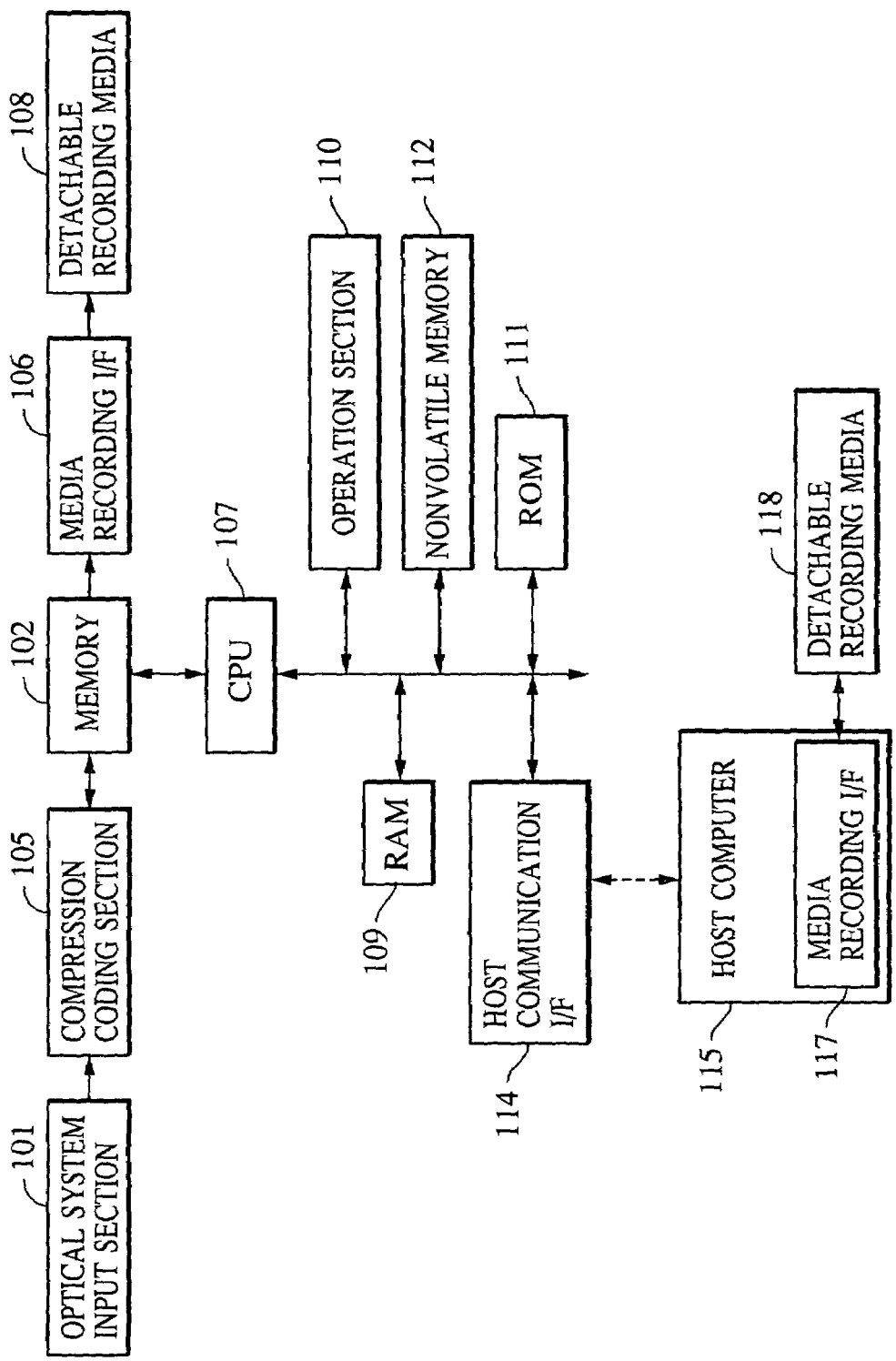
FIG. 1 is a block diagram showing the arrangement of a system constituted by an electronic digital camera serving as an embodiment of a recording device according to the present invention, and a host computer.

FIG. 1 is a block diagram showing the main characteristics of the arrangement of an electronic digital camera serving as an embodiment of a recording device according to the present invention. Optical input sections which are not directly related to this embodiment, e.g., a lens, a diaphragm, a shutter, a CCD, an A/D converter, a color signal processing circuit, and the like are shown as an optical system input section 101 for illustrative convenience.

The electronic digital camera according to this embodiment is constituted by an optical system input section 101, a memory 102, a compression coding section 105, a media recording I/F 106, a CPU 107, a RAM 109, an operation section 110, a ROM 111, a nonvolatile memory 112, and a host communication I/F 114.

Image data processed by the optical system input section 101 is temporarily stored in the memory 102. The compression coding section 105 compression-codes the image data subjected to a signal process by the optical system input section 101 and stored in the memory 102. The compression-coded image data is written in a detachable recording media 108 through a media recording I/F 106. At this time, one image data file is generated for each image. As a method of compressing image data, for example, the JPEG method (compression method described in ISO/IECDIS 10918-1) standardized as an international standard scheme can be used.

The media recording I/F 106 has a memory card interface standardized by PCMCIA or JEIDA (Japan Electronic Industry Development Association) as an interface for, e.g., the detachable recording media 108. More specifically, the media recording I/F 106 has a logic circuit and an interface connector for reading/writing the image data received from the compression coding section 105 from/in the detachable recording media 108 according to an interface protocol. As the detachable recording media 108, a memory card, a hard disk, or the like which is suitable for the interface protocol can be used. Files are recorded on the detachable recording media 108 according to, e.g., FAT (File Allocation Table) file system protocol of DOS (Disk Operating System).

Such a photographing recording operation or a communication operation (to be described later) is controlled by the CPU 107. A program for the photographing recording and the communication are stored in the read-only memory (ROM) 111, and the RAM 109 is used when the program read from the ROM 111 is executed.

The digital camera according to this embodiment is constituted such that a user uses the operation section 110 to set an image size (setting of a photographing recording mode). For example, image sizes of 640×480 and 320×240 can be selected. When the image size of 640×480 is selected, a generated file name is formed by using three head letters, e.g., "LRG" having a 5-digit serial number following the head letters. In this case, as the file name, LRG00001.JPG is used. On the other hand, the image size of 320×240 is selected, a generated file name is formed by using three head letters, e.g., "MED", having a 5-digit serial number following the head letters. In this case, as the file name, MED00002.JPG is used.

The host communication I/F 114 used for communication with an external host computer 115 includes an interface circuit such as an RS232C, a logic circuit for character sync communication, and the like. Software recorded on the ROM (Read Only Memory) 111 of the camera is constituted such that the CPU 107 of the camera operates while understanding information sent from the host computer 115 to the host communication I/F 114. The host computer 115 is connected to the outside of the camera by using the RS232C, so that an application operated on the host computer 115 can communicate with the camera through the RS232C. In a usual photographing state, the camera and the host computer 115 are used in a disconnection state.

The host computer 115 may be designed to perform a read/write operation of the detachable recording media 108 mounted on the camera through a communication path 116, the host communication I/F 114, and the camera. On the other hand, a media recording I/F 117 for performing a read/write operation of a detachable recording media 118 may be added to the host computer 115 itself to read an image file photographed by the camera from the detachable recording media 118. When the image file is read, as shown in FIG. 5, the file name is displayed on a window 503 on a screen 500 of the host computer 115.

Figure 4:
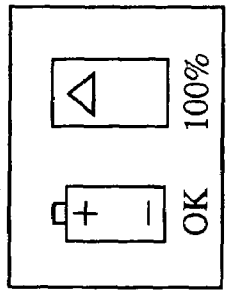
FIG. 4 is a view showing a screen of a host computer set when attribute information is input.

In this embodiment, a user can input attribute information added to a data file in a camera through a GUI (Graphical User Interface) presented by the application of the host computer 115. The screen of the host computer 115 (when attribute information is input) is as shown in FIG. 4. As the attribute information, the exclusive user information of a camera, e.g., user information, i.e., a name, a section, an address (e.g., Ozaki, Suzuki, etc), is input.

Attribute information input by a user is transferred to the camera through the communication path 116 and the host communication interface 114. The camera stores the transferred attribute information in the nonvolatile memory 112, e.g., an EEPROM. When stored data is to be seen, the data is displayed on the screen of the host computer 115 as shown in FIG. 5.

Although the order of explanations is reversed, in FIG. 5, reference numeral 505 denotes attribute information of each data file. Reference symbol "Thm" denotes a reduced image; "Med", an intermediate image size; "Sml", a small image size; and "Lrg", a large image size. In FIG. 5, reference numeral 507 denotes a user information of the camera as attribute information.

When attribute information set by a user is present in the nonvolatile memory 112, and an image data file is formed, the camera stores the attribute information in the file according to a predetermined format. For example, in case of JPEG, the attribute information can be stored by using an area (=application marker segment) which can be freely used by an application.

In this embodiment, a user can input information related to a method of constituting the name of a data file in the camera through a GUI (Graphical User Interface) presented by the application. For example, information related to three head letters of the file name is input. The three head letters of the file name input by the user is transferred to the camera through the communication path 116 and the host communication I/F 114. The camera stores the transferred information in the nonvolatile memory 112.

When three head letters of the file name set by the user are present in the nonvolatile memory 112, and an image data file is formed, the camera forms a file name by using the three head letters of the file name and 5-digit serial number following the three head letters.

Figure 2:
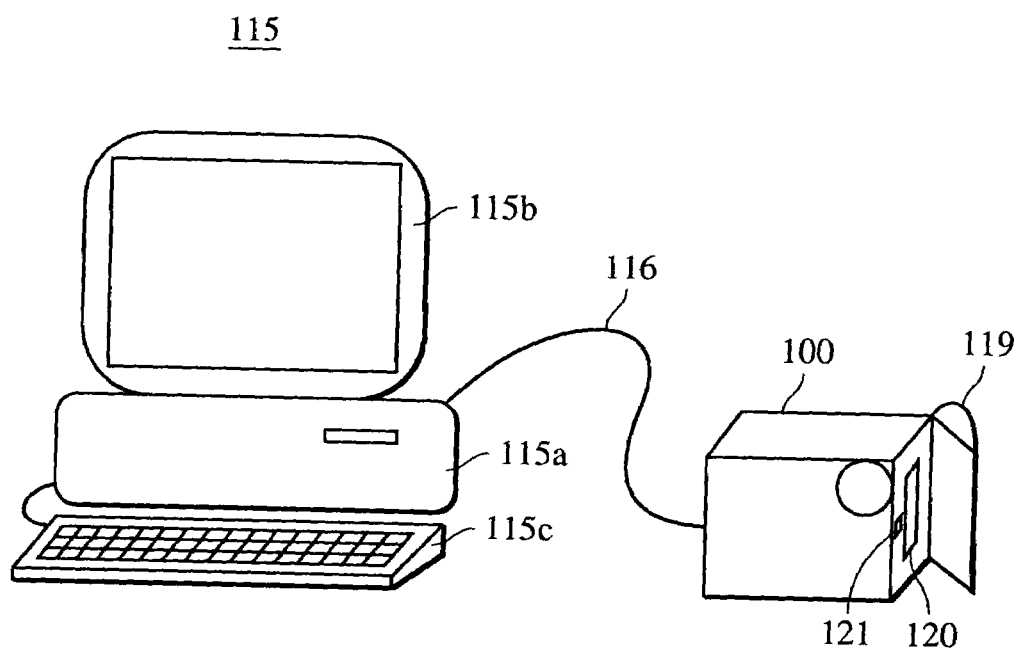
FIG. 2 is a view showing the appearance of a detailed arrangement for realizing an electronic digital camera serving as an embodiment of a recording device according to the present invention, and a host computer.

FIG. 2 is a view showing a detailed arrangement of the digital camera according to this embodiment arranged as described above and the host computer 115. Referring to FIG. 2, the host computer 115 is constituted by a personal computer body 115a having a known arrangement, a display 115b for displaying an image or the like, and a keyboard 115c for inputting information. A digital camera 100 according to this embodiment has a PCMCIA card slot 120, so that a digital image photographed by the digital camera 100 is recorded on a PCMCIA card.

Reference numeral 119 denotes a PCMCIA slot cover. When the PCMCIA slot cover 119 is closed, the PCMCIA card slot 120 is concealed, and the PCMCIA card cannot be inserted or removed. Only when the PCMCIA slot cover 119 is open, the PCMCIA card can be inserted or removed. Reference numeral 121 denotes a card cover switch (not shown in FIG. 1) for detecting the opening/closing state of the PCMCIA slot cover 119. The card cover switch 121 is turned on when the PCMCIA slot cover 119 is completely closed, and is turned off when the PCMCIA slot cover 119 is open.

The communication path 116 for connecting the digital camera 100 according to this embodiment to the host computer 115 is constituted by a serial or parallel cable. Through the cable 116, the host computer 115 can receive an image recorded on the PCMCIA card of the digital camera 100 to display the image, or can record data on the PCMCIA card. In this case, the host communication I/F 114 in FIG. 1 includes a serial or parallel input/output port.

Figure 3:
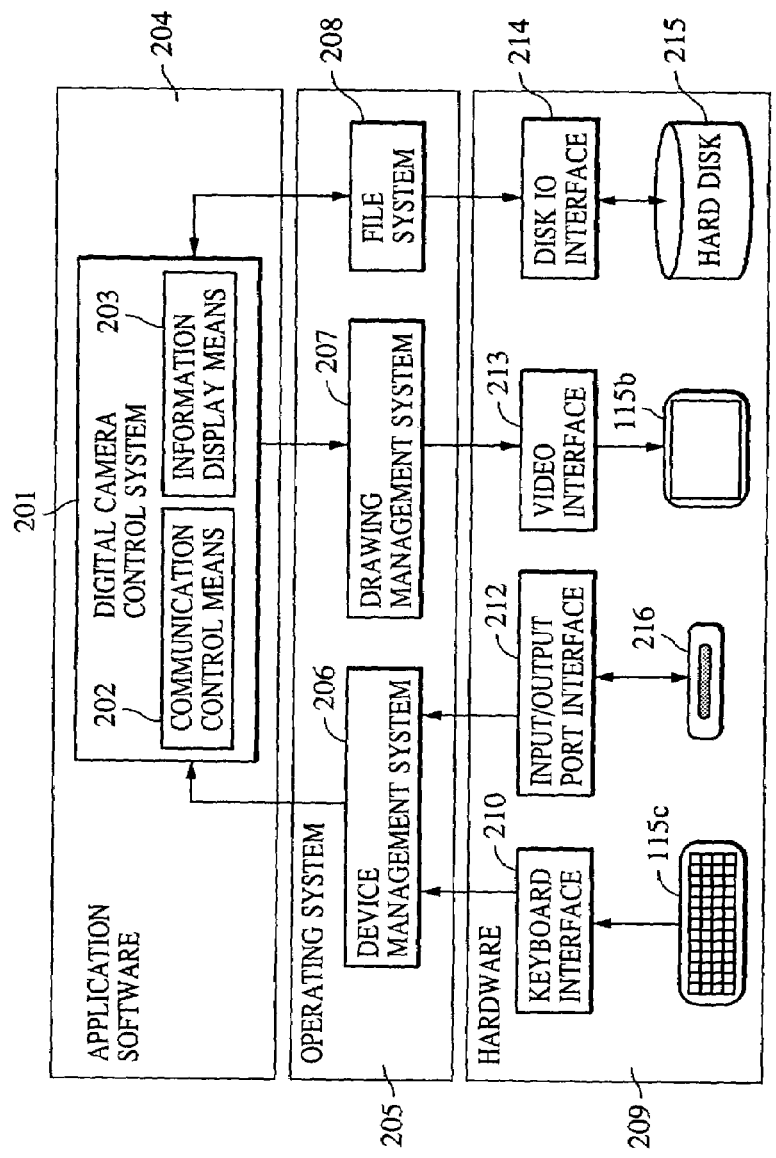
FIG. 3 is a view showing a detailed arrangement of the host computer shown in FIG. 2.

FIG. 3 is a view showing a detailed arrangement of the host computer 115. Referring to FIG. 3, reference numeral 209 denotes hardware; 205, an operating system (OS) operated on the hardware 209; and 204, application software operated on the OS 205.

Blocks constituting the hardware 209 and the OS 205, blocks which are included as constituent elements as a matter of course but are not directly required for explanation of this embodiment are not illustrated. As such blocks (not shown), a CPU, a memory, and the like serves as hardware 209, and a memory management system or the like serves as the OS 205.

Reference numeral 215 denotes a hard disk for physically storing files or data. Reference numeral 208 denotes a file system constituting the OS 205 and having a function of making it possible that the application software 204 can input/output a file regardless of the hardware 209. Reference numeral 214 denotes a disk IO interface used when the file system 208 performs a read/write operation of the hard disk 215.

Reference numeral 207 denotes a drawing management system constituting the OS 205 and having a function of causing the application software 204 to perform drawing regardless of the hardware 209. Reference numeral 213 denotes a video interface used when the drawing management system 207 performs drawing on the display 115b.

Reference numeral 206 denotes a device management system constituting the OS 205. The device management system 206 has a function of causing the application software 204 to receive an input from a device connected to an external section regardless of the hardware 209 and making it possible to perform an output operation to the device. Reference numeral 210 denotes a keyboard interface for receiving an input from the keyboard 115c, and reference numeral 212 denotes an input/output port interface used when the device management system 206 receives an input from the input/output port 216 and performs an output operation.

The input/output port 216 is a parallel or serial port, and is connected to the parallel or serial cable 116. Reference numeral 201 denotes a digital camera control system comprising the communication control means 202 and the information display means 203. The communication control means 202 requests the digital camera 100 to transmit an image or requests the digital camera 100 to write data therein. The information display means 203 displays data transmitted from the digital camera 100 or displays the state of the digital camera 100 for a user. A case wherein data from the digital camera 100 is displayed on the window 503 in the screen on the host computer 115 is shown in FIG. 5.

<Another Embodiment>

In the above embodiment, attribute information and file name process information set by a user are transferred from the host computer 115 to the digital camera according to this embodiment through a communication path 116 to be held in the nonvolatile memory 112. More specifically, in the above arrangement, the pieces of information can be set for respective cameras.

As another embodiment, the following arrangement is provided. That is, a media recording I/F 117 for a read/write operation of a detachable recording media 118 is attached to the host computer 115, and a data file in which the attribute information and file name constituting information are stored is formed on the detachable recording media 118. When the camera receives a detachable recording media 108, and when there is a data file in which the pieces of set information are stored, attribute information may stored in an image file by using the set information, or the file name may be determined. In this manner, the attribute information and the file name can be changed for each detachable recording media, and more compatible recording of attribute information and formation of a file name can be performed.

In the above embodiment, the attribute information and the file name constituting information set by a user are transferred from the host computer 115 to the camera through the communication path 116 to be held in the nonvolatile memory 112. However, these settings may be made by an operation section 110 of the camera.

Although a method of constituting a file name having three head letters which can be changed is described in the above embodiment, the number of letters may be arbitrarily set within limit related to the length of a file name. Although only a case of image is described in the above embodiment, settings may be made in either case of image or case of voice. When a compressed image is formed together with an original image, it may be made possible to perform a setting for the compressed image. In this manner, a categorizing operation for voice, main images, and compressed images becomes considerably easy.

In order to operate various devices to realize the functions of the above embodiment, the program codes of software for realizing the functions of the embodiment is supplied to a computer in an apparatus connected to the various devices or in the system. An embodiment wherein the various devices are operated according a program stored in the computer (CPU or MPU) of the system or the apparatus is included in the spirit and scope of the present invention.

In this case, the functions of the above embodiment are realized by the program codes themselves of the software. The program codes themselves and a means for supplying the program codes to the computer, e.g., a storage media in which the program codes are stored, constitute the present invention. As the storage media for storing the program codes, for example, a floppy disk, a hard disk, an optical disk, an photomagnetic disk, a CD-ROM, a magnetic tape, a nonvolatile memory card, a ROM, or the like can be used.

Note only in a case wherein the functions of the above embodiment are realized such that the computer executes the supplied program codes, but also in the following case, the program codes are included in the embodiment of the present invention as a matter of course. That is, the functions of the above embodiment are realized by simultaneously using an OS (Operating System) in which the program codes are active in the computer, another application software, and the like.

Furthermore, the following case is included in the present invention as a matter of course. That is, after the supplied program codes are stored in a memory incorporated in a function extension board of the computer or in a function extension unit connected to the computer, a CPU or the like incorporated in the function extension board or the function extension unit partially or entirely executes actual processes on the basis of the instruction of the program codes, and the functions of the above embodiment are realized by the processes.

As has been described above, according to the embodiment, exclusive user information of a recording device can be externally freely updated.

In addition to the above advantage, the exclusive user attribute can be added to files recorded by the recording device. For this reason, the files can be advantageously arranged later.

An attribute data set by a user can be automatically added to an image data file or a voice data file as image data or an additional attribute except for an additional attribute generated by the recording device in recording of image data or voice data to record the image data or the voice data.

A file name to be recorded on a recording media can be changed according to a photographing recording mode set by a user.

According to constituting method information of file name set by a user, the name of an image data file or a voice data file can be determined by a method different from a naming method fixedly used by the recording device.

Attribute data set for each detachable recording media by a user can be automatically added to an image data file or a voice data file as an additional attribute except for an additional attribute generated by the recording device during a recording operation of image data or voice data to be recorded.

According to constituting method information of file name set for each detachable recording media by a user, the name of an image data file or a voice data file can be determined by a method different from a naming method fixedly used by the recording device.

Since a file name itself can include effective information for searching, for example, searching on a host computer arranged outside the recording device can be considerably easily performed advantageously. In particular, since a file name can be changed for each recording device or each detachable recording media, arrangement or searching for files on various applications operated on the host computer can be easily performed.

Since effective information for searching can be included in a file, for example, searching on a host computer arranged outside the recording apparatus can be considerably easily performed advantageously. In this case, since attribute information can be changed for each recording device or each detachable recording media, arrangement or searching for files on various applications operated on the host computer can be easily performed.

In the above embodiment, exclusive user information in the digital camera can be rewritten from an external device. In this case, an embodiment made to prevent the exclusive information from being rewritten by a third party who does not a proper user will be described below.

In this embodiment, only when a predetermined password code is input from an external device, it is made possible to rewrite the exclusive user information.

For this reason, the exclusive user information and an authentication code paired with the exclusive user information are stored in the digital camera. When the exclusive information is rewritten from the external device, the user inputs an authentication code. Only when the input authentication code and the authentication code in the digital camera satisfy a predetermined relationship, e.g., coincide with each other, it is made possible that the user rewrite the exclusive user information.

Accordingly, the exclusive user information can be made impossible to be easily rewritten by the external device, and the exclusive user information can be managed more safely.

In this case, the authentication code may be the same as the exclusive user information.

What is claimed is:

1. A recording device for recording at least one of image data and voice data on a detachable recording medium, said recording device comprising:
   selection means for selecting a generation condition of image data or voice data;
   generating means for generating image data or voice data in accordance with the generation condition selected by said selection means;
   retrieving means for retrieving information pre-recorded in the detachable recording medium for determining a file name, the information comprising a character to appear in the file name;
   file name determining means for determining a file name in accordance with the information retrieved from the detachable recording medium, wherein the file name comprises a leading portion and an extension, and wherein said file name determining means comprises means for determining the leading portion of the file name so that the leading portion comprises (1) the character from the information retrieved from the detachable recording medium and (2) a serial number, wherein the character precedes the serial number; and
   recording means for recording, on the detachable recording medium, a file including the image data or voice data generated by said generating means using the file name determined by said file name determining means.

2. A recording device according to claim 1, wherein the information pre-recorded on the detachable recording medium is information comprising a plurality of characters,
   wherein said file name determining means determines the file name so that the leading portion comprises the plurality of characters, and
   wherein the plurality of characters precede the serial number.

3. A method for recording at least one of image data and voice data on a detachable recording medium, said recording method comprising:
   selecting a generation condition of image data or voice data;
   generating image data or voice data in accordance with the generation condition selected in said selecting step;
   retrieving information pre-recorded in the detachable recording medium for determining a file name, the information comprising a character to appear in the file name;
   determining a file name in accordance with the information retrieved from the detachable recording medium, wherein the file name comprises a leading portion and an extension, and wherein said determining step comprises a step of determining the leading portion of the file name so that the leading portion comprises (1) the character from the information retrieved from the detachable recording medium and (2) a serial number, wherein the character precedes the serial number; and
   recording, on the detachable recording medium, a file including the image data or voice data generated in said generating step using the file name determined in said file name determining step.

4. A recording method according to claim 3, wherein the information pre-recorded on the detachable recording medium is information comprising a plurality of characters, wherein the file name is determined so that the leading portion comprises the plurality of characters, and wherein the plurality of characters precede the serial number.

5. A recording apparatus for recording at least one of image data and voice data on a detachable recording medium, said recording apparatus comprising:

a selector that selects a generation condition of image data or voice data;

a data generator that generates image data or voice data in accordance with the generation condition selected by said selector;

a reproducing device that reproduces information pre-recorded in the detachable recording medium for determining a file name, the information comprising a character to appear in the file name;

a data processor that determines a file name in accordance with the information reproduced from the detachable recording medium, wherein the file name comprises a leading portion and an extension, and wherein said data processor determines the leading portion of the file name so that the leading portion comprises (1) the character from the information retrieved from the detachable recording medium and (2) a serial number, wherein the character precedes the serial number; and a recording device that records, on the detachable recording medium, a file including the image data or voice data generated by said data generator using the file name determined by said data processor.

6. A computer readable medium having stored therein an executable program for recording at least one of image data and voice data on a detachable recording medium, the program performing a method comprising the steps of:

selecting a generation condition of image data or voice data;

generating image data or voice data in accordance with the generation condition selected in said selecting step;

retrieving information pre-recorded in the detachable recording medium for determining a file name, the information comprising a character to appear in the file name;

determining a file name in accordance with the information, wherein the file name comprises a leading portion and an extension, and wherein said determining step comprises a step of determining the leading portion of the file name so that the leading portion comprises (1) the character from the information retrieved from the detachable recording medium and (2) a serial number, wherein the character precedes the serial number; and recording, on the detachable recording medium, a file including the image data or voice data generated in said generating step using the file name determined in said file name determining step.

7. A recording device for recording image data on a detachable recording medium, said recording device comprising:

selection means for selecting a generation condition of image data;

generating means for generating image data in accordance with the generation condition selected by said selection means;

retrieving means for retrieving information pre-recorded in the detachable recording medium for determining a file name, the information comprising a character to appear in the file name;

file name determining means for determining a file name in accordance with the information retrieved from the detachable recording medium, wherein the file name comprises a leading portion and an extension, and wherein said file name determining means comprises means for determining the leading portion of the file name so that the leading portion comprises (1) the character from the information retrieved from the detachable recording medium and (2) a serial number, wherein the character precedes the serial number; and recording means for recording, on the detachable recording medium, a file including the image data generated by said generating means using the file name determined by said file name determining means.

8. A method for recording image data on a detachable recording medium, said recording method comprising:

selecting a generation condition of image data;

generating image data in accordance with the generation condition selected in said selecting step;

retrieving information pre-recorded in the detachable recording medium for determining a file name, the information comprising a character to appear in the file name;

determining a file name in accordance with the information retrieved from the detachable recording medium, wherein the file name comprises a leading portion and an extension, and wherein said determining step comprises a step of determining the leading portion of the file name so that the leading portion comprises (1) the character from the information retrieved from the detachable recording medium and (2) a serial number, wherein the character precedes the serial number; and recording, on the detachable recording medium, a file including the image data generated in said generating step using the file name determined in said file name determining step.

* * * * *

UNITED STATES PATENT AND TRADEMARK OFFICE
CERTIFICATE OF CORRECTION

PATENT NO. : 7,030,914 B2
APPLICATION NO. : 08/892092
DATED : April 18, 2006
INVENTOR(S) : Taku Yamagami Page 1 of 1

It is certified that error appears in the above-identified patent and that said Letters Patent is hereby corrected as shown below:

COLUMN 2
Line 7, "set," should read --user-set--.

COLUMN 6
Line 12, "may" should read --may be--.

COLUMN 7
Line 53, "does" should read --is--.

Signed and Sealed this

Nineteenth Day of December, 2006

JON W. DUDAS
*Director of the United States Patent and Trademark Office*